US009622246B2

United States Patent
Gaal et al.

(10) Patent No.: US 9,622,246 B2
(45) Date of Patent: Apr. 11, 2017

(54) SCRAMBLING SEQUENCE GENERATION IN A COMMUNICATION SYSTEM

(71) Applicant: QUALCOMM Incorporated, San Diego, CA (US)

(72) Inventors: Peter Gaal, San Diego, CA (US); Juan Montojo, Nuremberg (DE)

(73) Assignee: QUALCOMM Incorporated, San Diego, CA (US)

( * ) Notice: Subject to any disclaimer, the term of this patent is extended or adjusted under 35 U.S.C. 154(b) by 134 days.

(21) Appl. No.: 14/500,150

(22) Filed: Sep. 29, 2014

(65) Prior Publication Data

US 2015/0016396 A1 Jan. 15, 2015

Related U.S. Application Data

(62) Division of application No. 12/244,678, filed on Oct. 2, 2008, now Pat. No. 8,848,913.

(Continued)

(51) Int. Cl.
*H04J 11/00* (2006.01)
*H04K 1/10* (2006.01)
(Continued)

(52) U.S. Cl.
CPC ........ *H04W 72/0466* (2013.01); *G06F 7/584* (2013.01); *H04L 5/0048* (2013.01);
(Continued)

(58) Field of Classification Search
CPC ....... H04L 9/28; H04L 9/00; H04L 25/03866; H04L 25/03872; H04L 5/0007; G06F 15/76; G06F 9/06; G06F 1/02
(Continued)

(56) References Cited

U.S. PATENT DOCUMENTS 3,995,115 A 11/1976 Kelly
4,773,092 A * 9/1988 Huang ............... H04K 1/04
380/276
(Continued)

FOREIGN PATENT DOCUMENTS

CN 1306350 A 8/2001
CN 1496620 A 5/2004
(Continued)

OTHER PUBLICATIONS

3GPP, "LTE Scrambling Codes", Ericsson, Qualcomm. Mokia, NSN, R1-075089, Nov. 13, 2007, pp. 2.
(Continued)

*Primary Examiner* — Hanh N Nguyen
(74) *Attorney, Agent, or Firm* — Jimmy Cheng (57) ABSTRACT

Techniques for performing scrambling and descrambling in a communication system are described. In an aspect, different scrambling sequences for different channels and signals may be generated based on different cyclic shifts of a base scrambling sequence, which may be a maximal-length sequence. A scrambling sequence for a given channel may be generated by (i) determining a sequence selector value based on a channel type value and at least one parameter value for the channel and (ii) cyclically shifting the base scrambling sequence based on the sequence selector value. In another aspect, a reference signal sent on variable system bandwidth may be generated with two scrambling sequences, which may be different cyclic shifts of a base scrambling sequence. Scrambling/descrambling for positive and negative frequencies for the reference signal may be performed with the first and second scrambling sequences, respectively.

12 Claims, 7 Drawing Sheets

Related U.S. Application Data (60) Provisional application No. 60/977,638, filed on Oct. 4, 2007.

(51) Int. Cl.
*H04W 72/04* (2009.01)
*G06F 7/58* (2006.01)
*H04L 25/03* (2006.01)
*H04L 5/00* (2006.01)
*H04L 27/26* (2006.01)

(52) U.S. Cl.
CPC ...... *H04L 25/03866* (2013.01); *H04L 5/0016* (2013.01); *H04L 27/2613* (2013.01)

(58) Field of Classification Search
USPC ................ 370/203–210, 335, 329, 280; 375/260–265
See application file for complete search history.

(56) References Cited

U.S. PATENT DOCUMENTS

| | | | |
|---|---|---|---|
| 4,811,394 A * | 3/1989 | Ragavan | ......... H04L 25/03866 370/280 |
| 5,111,416 A | 5/1992 | Harada | |
| 5,596,571 A | 1/1997 | Gould et al. | |
| 6,339,781 B1 | 1/2002 | Sasaki | |
| 6,590,951 B1 | 7/2003 | Kim et al. | |
| 6,798,736 B1 | 9/2004 | Black et al. | |
| 6,831,905 B1 | 12/2004 | Lomp et al. | |
| 6,922,435 B2 | 7/2005 | Neufeld et al. | |
| 6,985,516 B1 | 1/2006 | Easton et al. | |
| 7,003,269 B2 | 2/2006 | Willenegger | |
| 7,236,512 B2 | 6/2007 | Blessent et al. | |
| 7,286,589 B1 * | 10/2007 | Toussi | ............... H04J 13/10 375/130 |
| 7,386,026 B1 | 6/2008 | Gold | |
| 7,583,584 B2 | 9/2009 | Wang et al. | |
| 7,869,531 B2 * | 1/2011 | Deguchi | ............... H04L 5/0016 370/208 |
| 8,169,944 B2 | 5/2012 | Walton et al. | |
| 8,208,364 B2 | 6/2012 | Walton et al. | |
| 8,340,216 B2 | 12/2012 | Schotten et al. | |
| 8,787,181 B2 | 7/2014 | Gaal et al. | |
| 8,848,913 B2 | 9/2014 | Gaal et al. | |
| 2002/0012384 A1 | 1/2002 | Berens | |
| 2003/0223397 A1 | 12/2003 | Iacono et al. | |
| 2004/0062397 A1 | 4/2004 | Amer | |
| 2004/0223472 A1 * | 11/2004 | Sankaran | .......... H04L 25/03866 370/335 |
| 2004/0233885 A1 | 11/2004 | Helmke | |
| 2005/0124352 A1 | 6/2005 | Fernandez-Corbaton et al. | |
| 2005/0169349 A1 | 8/2005 | Hwang et al. | |
| 2005/0286405 A1 | 12/2005 | Sun et al. | |
| 2006/0206780 A1 | 9/2006 | Ariyama | |
| 2006/0290508 A1 | 12/2006 | Moutchkaev et al. | |
| 2007/0025462 A1 | 2/2007 | Sato | |
| 2007/0037541 A1 | 2/2007 | Wu et al. | |
| 2007/0082696 A1 | 4/2007 | Wang et al. | |
| 2007/0230600 A1 | 10/2007 | Bertrand et al. | |
| 2007/0253465 A1 | 11/2007 | Muharemovic et al. | |
| 2008/0043680 A1 | 2/2008 | Fitton | |
| 2008/0080472 A1 | 4/2008 | Bertrand et al. | |
| 2009/0092148 A1 | 4/2009 | Zhang et al. | |
| 2009/0204824 A1 | 8/2009 | Lin et al. | |
| 2009/0249027 A1 | 10/2009 | Kim et al. | |
| 2010/0220664 A1 | 9/2010 | Hooli et al. | |
| 2013/0094391 A1 | 4/2013 | Padovani et al. | |

FOREIGN PATENT DOCUMENTS

| | | |
|---|---|---|
| CN | 1497884 A | 5/2004 |
| CN | 1783763 A | 6/2006 |
| CN | 1993914 A | 7/2007 |
| EP | 1092270 A1 | 4/2001 |
| JP | H10512415 | 11/1998 |
| JP | 2001024624 A | 1/2001 |
| JP | 2002543666 | 12/2002 |
| JP | 2003504946 A | 2/2003 |
| JP | 2007028289 A | 2/2007 |
| JP | 2009535936 A | 10/2009 |
| JP | 5100747 B2 | 12/2012 |
| JP | 5130351 B2 | 1/2013 |
| RU | 95116586 | 9/1997 |
| RU | 2186460 C1 | 7/2002 |
| RU | 2187207 C2 | 8/2002 |
| RU | 2303856 C2 | 7/2007 |
| SU | 966864 A1 | 10/1982 |
| SU | 1387177 A1 | 4/1988 |
| TW | 200737825 | 10/2007 |
| WO | WO-9622639 A1 | 7/1996 |
| WO | WO-0018055 | 3/2000 |
| WO | WO-0060751 A1 | 10/2000 |
| WO | WO-0065757 A1 | 11/2000 |
| WO | WO-0105079 A1 | 1/2001 |
| WO | WO-0227961 A2 | 4/2002 |
| WO | WO-0245288 A2 | 6/2002 |
| WO | WO-03071707 A1 | 8/2003 |
| WO | WO-2004023692 A2 | 3/2004 |
| WO | WO-2004030224 A1 | 4/2004 |
| WO | WO-2004038951 A2 | 5/2004 |
| WO | WO-2004038984 A2 | 5/2004 |
| WO | WO-2004059936 A1 | 7/2004 |
| WO | WO-2005057976 A1 | 6/2005 |
| WO | WO-2006015268 A2 | 2/2006 |
| WO | WO-2006102252 A1 | 9/2006 |
| WO | WO-2006134829 A1 | 12/2006 |
| WO | WO-2007005978 A2 | 1/2007 |
| WO | WO-2007023810 A1 | 3/2007 |
| WO | WO-2007094775 A1 | 8/2007 |
| WO | WO-2007127902 A2 | 11/2007 |

OTHER PUBLICATIONS

3GPP TS 36.211 V8.0.0; 3rd Generation Partnership Project; Technical Specification Group Radio Access Network; Evolved Universal Terrestrial Radio Access (E-UTRA); Physical channels and modulation (Release 8), [Online] 2007, pp. 1-50, XP002520076 Retrieved from the Internet: URL:http://wwwSgpporg/ftp/Specs/html-i nf o/36211htm> [retrieved on Sep. 27, 2007] Section 5.

Choi D-W: "Parallel Scramblung Techniques for Digital Multiplexers" AT & T Technical Journal, American Telephone and Telegraph Co. New York, vol. 65, No. 5, Sep. 1, 1986 (Sep. 1, 1986), pp. 123-136, XP000616778 ISSN: 8756-2324 p. 123-p. 129.

International Search Report and Written Opinion—PCT/US2008/078794, International Search Authority—European Patent Office—Aug. 12, 2008.

Jian Ren et al: "CDMA physical layer built—i n security enhancement" Vehicular Technology Conference, 2003. VTC 2003—Fall. 2003 IEEE 58th Orlando, FL, USA Oct. 6-9, 2003; [IEEE Vehicular Technology Conference], Piscataway, NJ, USA,IEEE, US, vol. 3, Oct. 6, 2003 (Oct. 6, 2003), pp. 2157-2161, XP010701813 ISBN: .978-0-7803-7954-1 p. 2157-p. 2158; figure 1.

Motorola, "Uplink DM RS-Open Issues[online]", 3GPP R1-080065, <URL:http://www.3gpp.org/ftp/tsg_ran/WG1_RL1/TSGR1_51b/Docs/R1-080065.zip>,Jan. 9, 2008.

Nokia Siemens Networks et al: "Cyclic Shift Hopping and DM RS Signaling" 3rd Generation Partnership Project (3GPP); Technical Specification Group (TSG) Radio Access Network (RAN); Workinggroup 1 (WG1) , XX, XX #49, No. R1-072294, May 7, 2007 (May 7, 2007), pp. 1-4, XP002494363.

NTT Docomo et al: "Sequence Hopping and Cyclic-Shift Value Hopping for Uplink Reference Signal in E-UTRA" 3GPP TSG-RAN WG1 #48BIS ST Julians, Malta, No. R1-071643, Mar. 26, 2007 (Mar. 26, 2007), pp. 1-4, XP002494362.

NTT Docomo et al., "Hopping and Planning of Sequene Groups for Uplink RS",3GPP R1-074804,Nov. 9, 2007.

NTT Docomo et al: "Pilot Sequence Allocation Method in EUTRA Uplink" 3GPP TSG RAN WG1 Meeting #46, vol. R1-062103, Aug. 28, 2006 (Aug. 28, 2006) , XP050102648 Tallinn, Estonia.

(56) References Cited

OTHER PUBLICATIONS

Qualcomm Europe, "Completing the Scrambling Details in the specifications," R1-080487, 3GPP RAN1 #51 bis meeting (Jan. 18, 2008).
Qualcomm Europe, "Details on Scrambling", 3GPPTSG-RAN WG1#50b, R1-074429, Oct. 8-12, 2007, Shanghai, P. R. China. URL: http://www.3gpp.org/ftp/tsg_ran/WG1_RL1/TSGR1_50b/Docs/R1-074429.zip.
Qualcomm Europe, "Detailing on Scrambling," R1-074967, 3GPP RAN1 #51 meeting (Nov. 9, 2007).
Qualcomm Europe, "Hopping of UL DM-RS", 3 GPP R1-080963,Feb. 15, 2008.
Qualcomm Europe, "Hopping of UL DM-RS," R1-074950, 3GPP RAN1 #51 meeting (Nov. 9, 2007).
Qualcomm Europe: "Specification details for PRS sequences", 3GPP Draft, R1-080466, 3rd Generation Partnership Project (3GPP), Mobile Competence Centre, 650, Route Des Lucioles, F-06921 Sophia-Antipolis Cedex , France, vol. RAN WGI, No. Sevilla, Spain, 20080109, Jan. 9, 2008 (Jan. 9, 2008), XP050108984, [retrieved on Jan. 9, 2008].
Qualcomm Europe, "Specification details for PRS sequences", 3GPP TSG-RAN WG1#52, R1-080640, Jan. 9, 2008, Sorrento, Italy, URL: http://www.3gpp.org/ftp/tsg_ran/WG1_RL1/TSGR1_52/Docs/Ra-080640.zip.
Qualcomm Europe,"Hopping of UL DM-RS and Other Details", 3GPP R1-080468,Jan. 18, 2008.
Samsung, "Cyclic Shift Hopping of UL ACK Channels", 3GPP R1-073149,Jun. 29, 2007.
Samsung: "Implicit resource allocation for uplink ACK/NACK signaling", 3GPP TSG RAN WG1 #49, R1-072227, Kobe, Japan, May 7-11, 2007.
Taiwan Search Report—TW097138336—TIPO—Oct. 30, 2012.
Walther U et al: "Pn-generators embedded in high performance signal processors" ISCAS 2001. Proceedings of the 2001 IEEE International Symposium on Circuits and Systems. Sydney, Australia, May 6-9, 2001; [IEEE International Symposium on Circuits and Systems], New York, NY : IEEE, US, vol. 4, May 6, 2001 (May 6, 2001), pp. 45-48, XP010541788 ISBN: 978-0-7803-6685-5 pp. IV-46, left-hand column: figure 3 pp. IV-47, left-hand column; figure 6.
Taiwan Search Report—TW102115978—TIPO—Jan. 9, 2015.

\* cited by examiner

SCRAMBLING SEQUENCE GENERATION IN A COMMUNICATION SYSTEM

The present application is a divisional application of U.S. application Ser. No. 12/244,678, filed Oct. 2, 2008, assigned U.S. Pat. No. 8,848,913 with an issue date of Sep. 30, 2014, which claims priority to provisional U.S. application Ser. No. 60/977,638, filed Oct. 4, 2007, both assigned to the assignee hereof and incorporated herein by reference.

BACKGROUND

I. Field

The present disclosure relates generally to communication, and more specifically to techniques for generating scrambling sequences in a communication system.

II. Background

Communication systems are widely deployed to provide various communication content such as voice, video, packet data, messaging, broadcast, etc. These systems may be multiple-access systems capable of supporting multiple users by sharing the available system resources. Examples of such multiple-access systems include Code Division Multiple Access (CDMA) systems, Time Division Multiple Access (TDMA) systems, Frequency Division Multiple Access (FDMA) systems, Orthogonal FDMA (OFDMA) systems, and Single-Carrier FDMA (SC-FDMA) systems.

A communication system may apply scrambling at various points in a transmit signal generation process. Scrambling is a process in which data is multiplied with a scrambling sequence to randomize the data. The scrambling sequence may be a pseudo-random number (PN) sequence having good spectral and correlation properties. Scrambling may be performed for various purposes such as to randomize persistent interference between signals from different transmitters, to avoid undesired signal spectrum properties, etc. Scrambling may be performed in different manners for different channels and signals. It is desirable to efficiently perform scrambling for all channels and signals.

SUMMARY

Techniques for performing scrambling and descrambling in a communication system are described herein. In an aspect, different scrambling sequences for different channels and signals may be generated based on different cyclic shifts of a base scrambling sequence. The base scrambling sequence may be a maximal-length sequence generated with a linear feedback shift register (LFSR). The LFSR may implement a single generator polynomial that is applicable for all supported channels and signals.

In one design, the LFSR may be initialized to an initial state to generate the base scrambling sequence. A first scrambling sequence may be generated based on modulo-2 addition of a selected combination of LFSR outputs. The selected combination of LFSR outputs may be determined based on a sequence selector value for a channel. The sequence selector value may be determined based on a channel type value and at least one parameter value for the channel. The sequence selector value may comprise (i) a first set of bits that may be assigned different values for different supported channels and signals and (ii) a second set of bits for channel-specific or signal-specific parameters. Scrambling or descrambling for the channel may then be performed with the scrambling sequence.

In another aspect, two scrambling sequences may be used to generate a reference signal sent on a variable system bandwidth. In one design, the two scrambling sequences may be generated based on different cyclic shifts of a base scrambling sequence. The first scrambling sequence may have its start mapped to the center of the system bandwidth and may traverse outwardly in positive frequency direction. The second scrambling sequence may have its start mapped to the center of the system bandwidth and may traverse outwardly in negative frequency direction. Scrambling or descrambling for positive frequencies for the reference signal may be performed with the first scrambling sequence. Scrambling or descrambling for negative frequencies for the reference signal may be performed with the second scrambling sequence. This design may ensure that the scrambling sequences in the center of the system band are the same irrespective of the system bandwidth. This design may also simplify generation of the scrambling sequences for the reference signal regardless of the system bandwidth.

Various aspects and features of the disclosure are described in further detail below.

DETAILED DESCRIPTION

The techniques described herein may be used for various wireline and wireless communication systems such as CDMA, TDMA, FDMA, OFDMA, SC-FDMA and other systems. The terms "system" and "network" are often used interchangeably. A CDMA system may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) is an upcoming release of UMTS that uses E-UTRA, which employs OFDMA on the downlink and SC-FDMA on the uplink. UTRA, E-UTRA, UMTS, LTE and GSM are described in documents from an organization named "3rd Generation Partnership Project" (3GPP). cdma2000 and UMB are described in documents from an organization named "3rd Generation Partnership Project 2" (3GPP2). For clarity, certain aspects of the techniques are described below for LTE, and LTE terminology is used in much of the description below.

Figure 1:
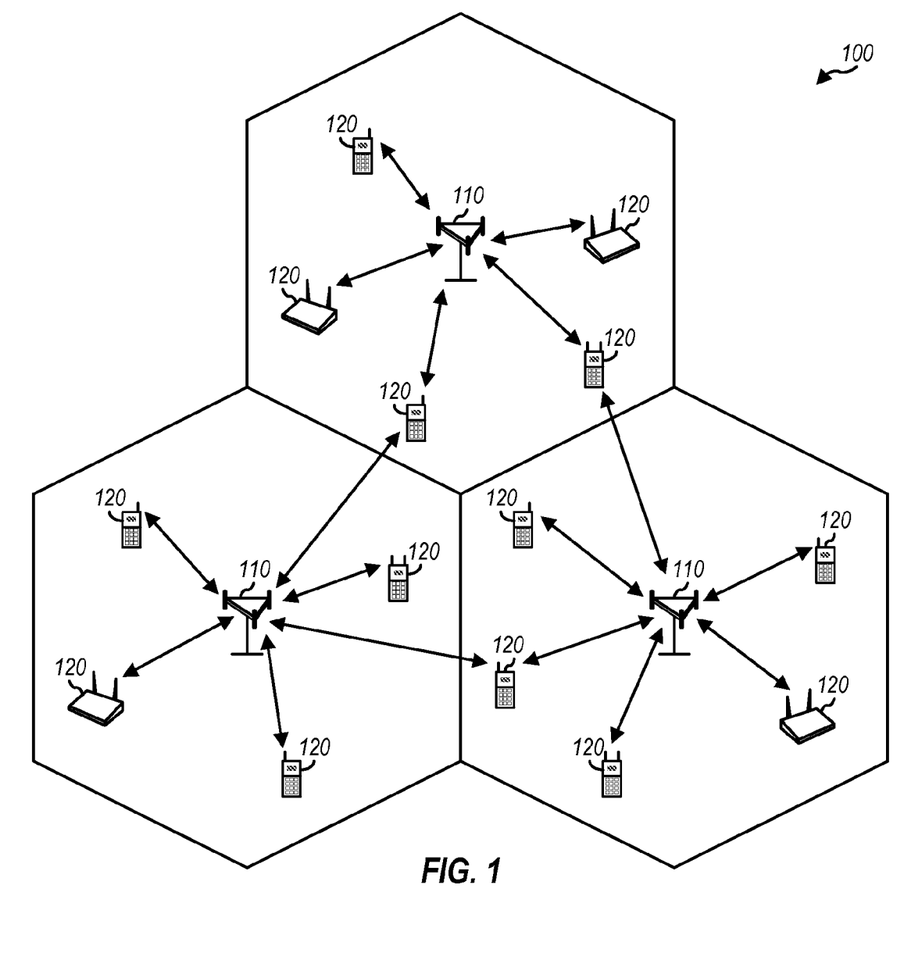
FIG. 1 shows a wireless communication system.

FIG. 1 shows a wireless communication system 100, which may be an LTE system. System 100 may include a number of Node Bs 110 and other network entities. A Node B may be a fixed station that communicates with the UEs and may also be referred to as an evolved Node B (eNB), a base station, an access point, etc. Each Node B 110 provides communication coverage for a particular geographic area. To improve system capacity, the overall coverage area of a Node B may be partitioned into multiple (e.g., three) smaller areas. Each smaller area may be served by a respective Node B subsystem. In 3GPP, the term "cell" can refer to the smallest coverage area of a Node B and/or a Node B subsystem serving this coverage area.

UEs 120 may be dispersed throughout the system, and each UE may be stationary or mobile. A UE may also be referred to as a mobile station, a terminal, an access terminal, a subscriber unit, a station, etc. A UE may be a cellular phone, a personal digital assistant (PDA), a wireless modem, a wireless communication device, a handheld device, a laptop computer, a cordless phone, etc. A UE may communicate with a Node B via the downlink and uplink. The downlink (or forward link) refers to the communication link from the Node B to the UE, and the uplink (or reverse link) refers to the communication link from the UE to the Node B.

LTE utilizes orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, K may be equal to 128, 256, 512, 1024 or 2048 for system bandwidth of 1.25, 2.5, 5, 10 or 20 MHz, respectively.

The K total subcarriers may be grouped into resource blocks. Each resource block may include N subcarriers (e.g., N=12 subcarriers) in one slot. The available resource blocks may be assigned to UEs for transmission of traffic data and control information.

Figure 2:
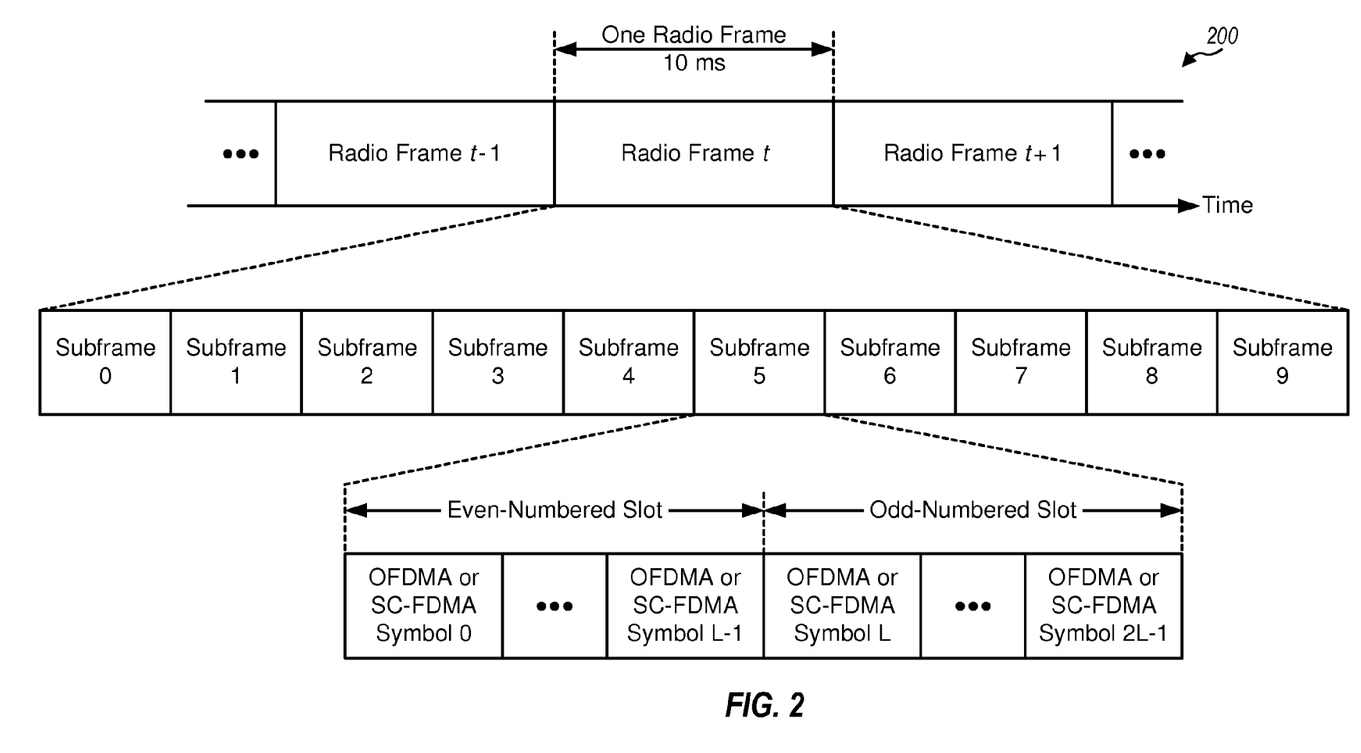
FIG. 2 shows an example frame structure.

FIG. 2 shows an example frame structure 200 used in LTE. The transmission timeline for the downlink may be partitioned into units of radio frames. Each radio frame may have a predetermined duration (e.g., 10 milliseconds (ms)) and may be partitioned into 10 subframes with indices of 0 through 9. Each subframe may include two slots, and each slot may include L symbol periods, e.g., L=6 symbol periods for an extended cyclic prefix (CP) or L=7 symbol periods for a normal cyclic prefix. The 2L symbol periods in each subframe may be assigned indices of 0 through 2L-1.

The system may support various channels used to send data and control information on the downlink and uplink. The system may also support reference signals and other signals used for various purposes. Table 1 lists some channels and signals that may be supported by the system in accordance with one design. The system may also support other channels and/or signals. A reference signal is a signal generated based on known data and may also be referred to as pilot, preamble, training, sounding, etc. A downlink reference signal (which may also be referred to as a cell-specific reference signal) may be generated with one or more pseudo-random sequences (PRS), as described below.

TABLE 1

| Channel/Signal | Name | Description |
| --- | --- | --- |
| Downlink reference signal | PRS | A signal sent by a Node B and used by the UEs for channel estimation and channel quality measurement. |
| Physical downlink control channel | PDCCH | Carry control information (e.g., scheduling information, ACK, NACK, etc.) on the downlink for different UEs. |
| Physical control format indicator channel | PCFICH | Carry information indicating number of PDCCH symbols per subframe. |
| Physical hybrid-ARQ indicator channel | PHICH | Carry feedback information (e.g., ACK, NACK) for HARQ. |
| Physical broadcast channel | PBCH | Carry cell-specific information broadcast to all UEs. |
| Physical multicast channel | PMCH | Carry multicast information sent to multiple UEs. |
| Physical downlink shared channel | PDSCH | Carry traffic data on the downlink to different UEs. |
| Physical uplink shared channel | PUSCH | Carry traffic data sent by different UEs on the uplink. |
| Physical uplink control channel | PUCCH | Carry control information sent by different UEs on the uplink. |

Scrambling may be performed at a transmitter for various channels and signals, such as those shown in Table 1. For some channels/signals, it may be desirable to have a scrambling sequence be associated with a resource element or block that a channel/signal occupies. For other channels/signals, it may be better to have the scrambling sequence be disassociated from the occupied resource element or block.

Descrambling may be performed at a receiver to undo the scrambling performed by the transmitter. Descrambling may be performed using the same scrambling sequence used at the transmitter for scrambling. It is desirable to efficiently generate scrambling sequences for different channels/signals.

In an aspect, a scrambling sequence generation design that may be used for scrambling and descrambling for different channels and signals is described. A base scrambling sequence may be generated such that different shifts of the sequence are sufficiently decorrelated. Different cyclic shifts of the base scrambling sequence may then be used for different channels and signals.

In one design, a binary maximum length sequence, which is also commonly referred to as an m-sequence, may be used as the base scrambling sequence. An m-sequence has the longest possible length of $L=2^Q-1$ for a given degree Q. An m-sequence may be generated with a linear feedback shift register (LFSR) that implements a primitive polynomial. The m-sequence length should be sufficiently long. In one design, a 50-bit LFSR may be used to generate an m-sequence with a length of $2^5-1$. A generator polynomial $G(x)$ for the m-sequence may be expressed as:

$$G(x) = x^{50} + g_{49} \cdot x^{49} + g_{48} \cdot x^{48} + \ldots + g_2 \cdot x^2 + g_1 \cdot x + 1, \quad \text{Eq (1)}$$

where $g_1$ through $g_{49}$ are coefficients of the generator polynomial, and $x^1$ through $x^{50}$ are outputs of the first through last delays, respectively, in the LFSR.

Equation (1) shows a general form for the generator polynomial $G(x)$. Each coefficient $g_i$, for $i=1, \ldots, 49$, may be equal to '1' or '0'. Different generator polynomials may be defined with different sets of values for the 49 coefficients $g_1$ through $g_{49}$.

In general, a generator polynomial $G(x)$ of any suitable degree may be used for the base scrambling sequence. The same generator polynomial $G(x)$ may be used for all channels and signals, which may then avoid having to reconfigure the LFSR. The LFSR may be set to the same initial state for all channels and signals. Different cyclic shifts of the base scrambling sequence may be obtained by modulo-2 summing different combinations of LFSR outputs. The specific LFSR outputs to include in the modulo-2 sum are determined by the desired cyclic shift. Alternatively, the desired cyclic shift may be achieved by setting different initial states and modulo-2 summing certain combination of LFSR outputs. More than one LFSR may also be used, and the generated outputs may be modulo-2 summed to obtain the desired scrambling sequence.

Figure 3:
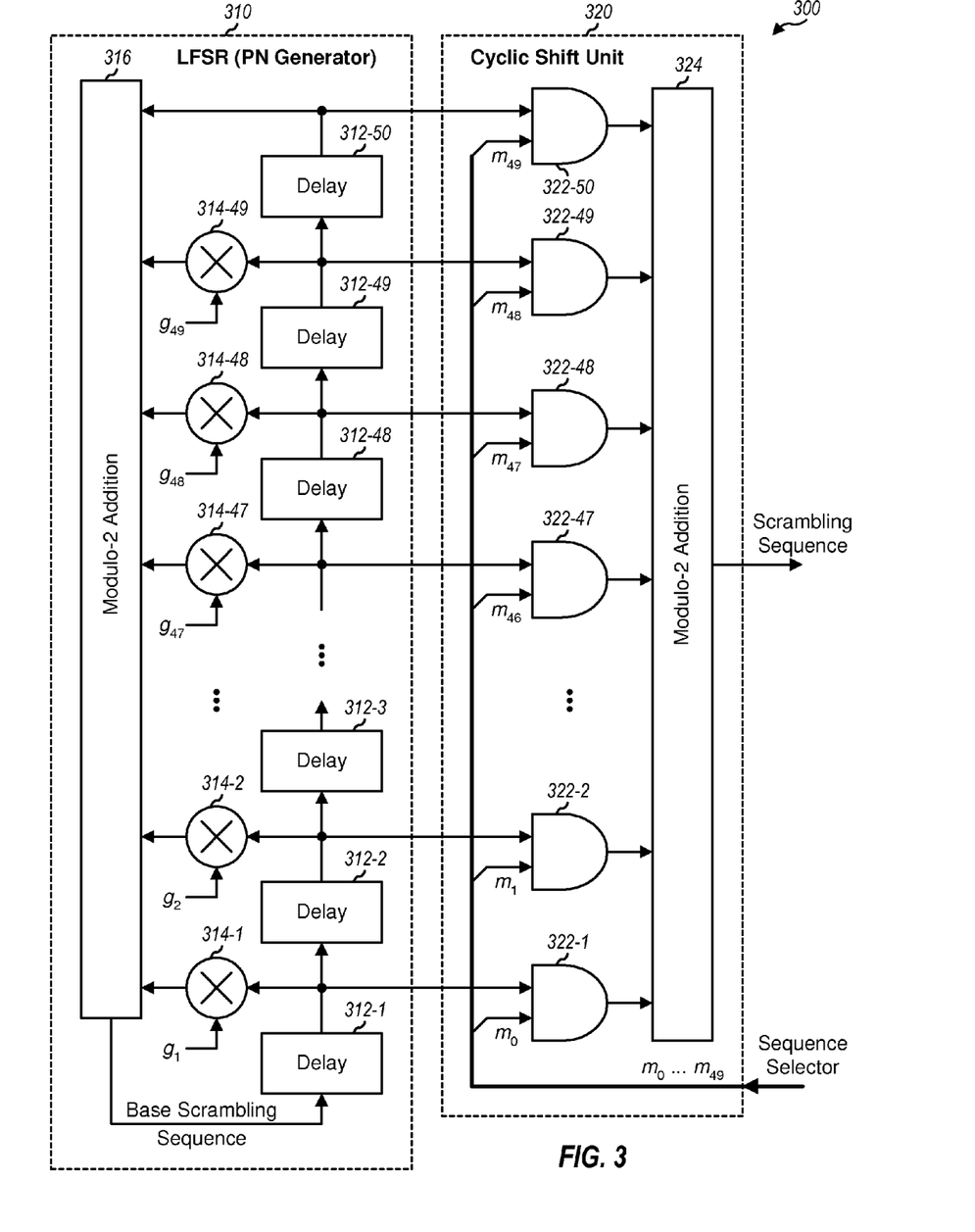
FIG. 3 shows a block diagram of a scrambling sequence generator.

FIG. 3 shows a block diagram of a design of a scrambling sequence generator 300 that implements the generator polynomial shown in equation (1). Generator 300 includes an LFSR 310 (which is also referred to as a PN generator) and a cyclic shift unit 320 (which is also referred to as a masking unit). Within LFSR 310, 50 delay units 312-1 through 312-50 are coupled in series, with each delay unit providing one sample period of delay. The first delay unit 312-1 has its input coupled to an output of a modulo-2 addition unit 316. Each remaining delay unit has its input coupled to an output of a preceding delay unit. The first 49 delay units 312-1 through 312-49 also provide their outputs to 49 multipliers 314-1 through 314-49, respectively. The last delay unit 312-50 provides its output directly to modulo-2 addition unit 316. Each multiplier 314 multiplies its input with a respective coefficient $g_i$ and provides its output to modulo-2 addition unit 316. FIG. 3 shows 49 multipliers 314-1 through 314-49 for 49 coefficients $g_1$ through $g_{49}$, respectively. Each multiplier 314 may be present if its coefficient $g_i$ is equal to '1' and may be omitted (for no connection) if its coefficient is equal to '0'. Unit 316 performs modulo-2 addition on all of its inputs and provides the base scrambling sequence, which is fed back to the first delay unit 312-1.

Within cyclic shift unit 320, 50 AND gates 322-1 through 322-50 receive the outputs of 50 delay units 312-1 through 312-50, respectively. The 50 AND gates 322-1 through 322-50 also receive 50 bits $m_0$ through $m_{49}$, respectively, of a sequence selector. The sequence selector determines the amount of cyclic shift, and different values of the 50 selector bits $m_0$ through $m_{49}$ correspond to different cyclic shifts of the base scrambling sequence. Each AND gate 322 performs logical AND on its two inputs and provides its output to a modulo-2 addition unit 324. Unit 324 performs modulo-2 addition on all of its 50 inputs and provides a scrambling sequence with the selected cyclic shift.

Scrambling sequence generator 300 may be reset at the beginning of every application of scrambling. For example, scrambling sequence generator 300 may be reset once at each symbol period for a downlink reference signal, once for every code block sent on the PDSCH, etc. For scrambling of binary encoded bits, one scrambling bit may be generated for each encoded bit, and each encoded bit may be multiplied with its scrambling bit to generate a scrambled bit. For descrambling, each scrambled bit may be multiplied with its scrambling bit to obtain the corresponding encoded bit.

The scrambling sequences for different channels and signals may be individualized by selecting different LFSR outputs for summing. In the design shown in equation (1) and FIG. 3, the 50 delay units 312-1 through 312-50 support 50 selector bits, which may be used to obtain $2^{50}$ different cyclic shifts. The 50 selector bits may be allocated for different channels and signals in various manners. Table 2 shows one design of allocating the 50 selector bits.

TABLE 2

| Field | Sequence selector assignment | Number of bits |
|---|---|---|
| Reserved | $m_{48}$ and $m_{49}$ | 2 |
| Channel/signal type | $m_{44} \ldots m_{47}$ | 4 |
| Channel/signal-specific fields | $m_0 \ldots m_{43}$ | 44 |

In the design shown in Table 2, the 50 selector bits are divided such that the first two bits are reserved, the next four bits are for channel/signal type, and the remaining 44 bits are for channel/signal-specific parameters.

Table 3 gives the values of the four selector bits $m_{44}$ through $m_{47}$ for different channel/signal types, in accordance with one design.

TABLE 3

Channel/Signal Type

| Channel/Signal | Channel type value |
|---|---|
| PRS (normal CP) | '0000' |
| PRS (extended CP) | '0001' |
| PDCCH | '0010' |
| PCFICH | '0011' |
| PHICH | '00100' |
| PBCH | '0101' |
| PMCH | '0110' |
| PDSCH | '0111' |
| PUSCH | '1000' |
| Other | Reserved |

A periodicity of 10 ms may be assumed for the PRS with normal cyclic prefix and extended cyclic prefix, PDCCH, PDSCH and PUSCH. A periodicity of 40 ms may be assumed for the PBCH. A periodicity of 10, 20 or 40 ms may be assumed for the PCFICH, PHICH and PMCH.

Table 4 gives signal-specific fields for the PRS with normal cyclic prefix and extended cyclic prefix, in accordance with one design. The Cell_ID parameter indicates a cell identifier (ID) for a cell transmitting a downlink reference signal. The SSC_ID parameter indicates a specific secondary synchronization code (SSC) sequence among a set of available SSC sequences. The Antenna_ID parameter indicates a specific antenna at a Node B. The Subframe_ID parameter indicates a specific subframe out of 10 subframes in a radio frame. The Symbol_ID parameter indicates a specific OFDMA symbol out of either 12 or 14 OFDMA symbols in a subframe. The Frequency_+/− parameter indicates whether a scrambling sequence is for positive or negative frequencies, as described below.

TABLE 4

Signal-Specific Fields for PRS

| Parameter | Number of Bits |
|---|---|
| PRS (normal CP) | |
| SSC_ID | 8 |
| Antenna_ID | 2 |
| Subframe_ID | 4 |
| Symbol_ID | 4 |
| Frequency_+/− | 1 |
| Reserved | 25 |
| PRS (extended CP) | |
| Cell_ID | 9 |
| Antenna_ID | 2 |
| Subframe_ID | 4 |

TABLE 4-continued

Signal-Specific Fields for PRS

| Parameter | Number of Bits |
|---|---|
| Symbol_ID | 4 |
| Frequency_+/− | 1 |
| Reserved | 24 |

Table 5 gives channel-specific fields for the PDCCH and PDSCH, in accordance with one design. The UE MAC_ID parameter indicates a Medium Access Control (MAC) ID assigned to a UE. The Stream_ID parameter indicates a data stream being sent on the PDSCH. The Code_Block_ID parameter indicates a specific code block being sent on the PDSCH. The design in Table 5 support scrambling as a function of the Cell_ID and the UE MAC_ID for the PDSCH.

TABLE 5

Channel-Specific Fields for PDCCH and PDSCH

| Parameter | Number of Bits |
|---|---|
| PDCCH | |
| Cell_ID | 9 |
| Subframe_ID | 4 |
| Symbol_ID | 4 |
| Reserved | 27 |
| PDSCH | |
| Cell_ID | 9 |
| UE MAC_ID | 16 |
| Stream_ID | 1 |
| Code_Block_ID | 6 |
| Reserved | 12 |

Table 6 gives channel-specific fields for the PBCH and PCFICH, in accordance with one design. The Frame_ID parameter indicates a specific radio frame.

TABLE 6

Channel-Specific Fields for PBCH and PCFICH

| Parameter | Number of Bits |
|---|---|
| PBCH | |
| Cell_ID | 9 |
| Frame_ID | 2 |
| Subframe_ID | 4 |
| Symbol_ID | 5 |
| Reserved | 24 |
| PCFICH | |
| Cell_ID | 9 |
| Subframe_ID | 4 |
| Reserved | 31 |

Table 7 gives channel-specific fields for the PHICH and PMCH, in accordance with one design.

TABLE 7

Channel-Specific Fields for PHICH and PMCH

| Parameter | Number of Bits |
|---|---|
| PHICH | |
| Cell_ID | 9 |
| Reserved | 35 |

TABLE 7-continued

Channel-Specific Fields for PHICH and PMCH

| Parameter | Number of Bits |
|---|---|
| PMCH | |
| Cell_ID | 9 |
| Reserved | 35 |

Table 8 gives channel-specific fields for the PUSCH in accordance with one design.

TABLE 8

Channel-Specific Fields for PUSCH
PUSCH

| Parameter | Number of Bits |
|---|---|
| UE MAC_ID | 16 |
| Code_Block_ID | 6 |
| Reserved | 22 |

In the design described above, a scrambling sequence for a channel or a signal may be generated based on a sequence selector value, which may comprise a set of parameter values for parameters/attributes of the channel or signal. The time periodicity of the scrambling sequence may be flexibly controlled by including the symbol ID, slot ID, subframe ID, frame ID, etc., in the set of parameters for the sequence selector. The scrambling sequence may be associated or disassociated with resource elements or blocks by including or excluding the resource element/block index in the set of parameters for the sequence selector.

The scrambling sequence generator described herein may simplify generation of scrambling sequences for all channels and signals of interest. The scrambling sequence generator can generate scrambling sequences for current channels and signals as well as new channels and signals that may be added in the future. New channels, signals and/or parameters may be supported by using some of the reserved values to convey the new channels, signals and/or parameters.

In one design, a single scrambling sequence generator may be used to generate scrambling sequences for all channels and signals. The scrambling sequence generator may be clocked as many times as needed for the longest scrambling sequence. For shorter scrambling sequences, only the initial part for the desired length may be generated. In another design, multiple instances of the scrambling sequence generator may be implemented, and each scrambling sequence generator may support one or more channels and/or signals. This design may be more suitable for certain hardware architectures.

In another aspect, two scrambling sequences may be used to generate a downlink reference signal that may be sent on a variable system bandwidth. For example, the system bandwidth may be 1.25, 2.5, 5, 10 or 20 MHz in LTE. It may be desirable to have a nested structure for the scrambling sequences for the downlink reference signal. For example, the scrambling sequences for system bandwidth of 10 MHz should match the center part of the scrambling sequences for system bandwidth of 20 MHz.

In one design, two scrambling sequences may be generated for the downlink reference signal and may be distinguished by the Frequency_+/− bit in the sequence selector. The scrambling sequences may be used as PRS sequences to generate the downlink reference signal. The first scrambling sequence may be used to scramble 'positive frequencies', and the second scrambling sequence may be used to scramble 'negative frequencies'.

Figure 4:
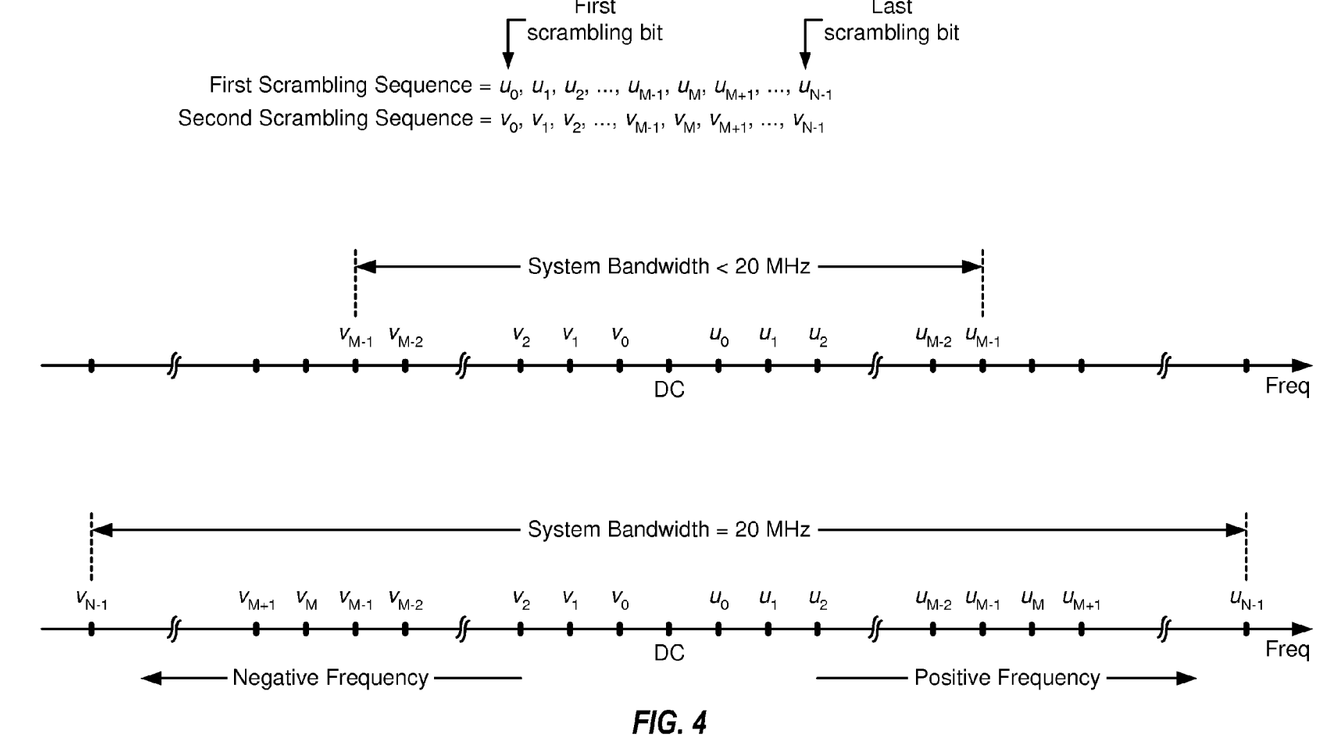
FIG. 4 shows use of two scrambling sequences for a reference signal.

FIG. 4 shows a design of generating two scrambling sequences for the downlink reference signal. The first scrambling sequence includes N scrambling bits $u_0$ through $u_{N-1}$, where N is the maximum number of scrambling bits needed for the largest system bandwidth of 20 MHz. The second scrambling sequence includes N scrambling bits $v_0$ through $v_{N-1}$. The first scrambling sequence may be generated with the parameters shown in Table 4 and with the Frequency_+/− parameter set to '1'. The second scrambling sequence may be generated with the same parameters but with the Frequency_+/− parameter set to '0'.

To generate the downlink reference signal, the first scrambling sequence may be used to scramble positive frequencies starting from the smallest positive frequency. The center or DC subcarrier is typically not used. The first scrambling sequence may be mapped to subcarriers used for the downlink reference signal in the order of increasing frequency, as shown in FIG. 4. The second scrambling sequence may be used to scramble 'negative frequencies' starting from the highest negative frequency, i.e., the subcarrier closest to the DC subcarrier. The second scrambling sequence may be mapped to the subcarriers used for the downlink reference signal in the opposite direction.

As shown in FIG. 4, for system bandwidth of 20 MHz, the entire first scrambling sequence may be used, and all N scrambling bits $u_0$ through $u_{N-1}$ may be mapped to N positive subcarriers used for the downlink reference signal. The entire second scrambling sequence may also be used, and all N scrambling bits $v_0$ through $v_{N-1}$ may be mapped to N negative subcarriers used for the downlink reference signal. For system bandwidth of less than 20 MHz, the initial portion of the first scrambling sequence may be used, and M scrambling bits $u_0$ through $u_{M-1}$ may be mapped to the M positive subcarriers used for the downlink reference signal. The initial portion of the second scrambling sequence may also be used, and M scrambling bits $v_0$ through $v_{M-1}$ may be mapped to the M negative subcarriers used for the downlink reference signal. M may be dependent on the system bandwidth and may be less than N.

The scrambling sequence generation design shown in FIG. 4 ensures that the scrambling sequences in the center of the system band are the same irrespective of the system bandwidth. Furthermore, this design does not require the entire first and second scrambling sequences to be generated in each OFDMA symbol carrying the downlink reference signal. By mapping the start of the first and second scrambling sequences to the center of the system bandwidth and by traversing outwardly in both positive and negative frequency directions, as shown in FIG. 4, only scrambling bits that are actually used are generated. This design may simplify scrambling sequence generation and may avoid redundant operations. This design may also efficiently support different system bandwidths, different number of subcarriers used for the downlink reference signal, and different scrambling sequence lengths.

The design in FIG. 4 may also allow for simultaneously generation of the first and second scrambling sequences for the positive and negative frequency parts of the downlink reference signal. If the scrambling sequences are very long, then the scrambling sequences may be partitioned into segments, and different segments of the scrambling sequences may be processed in parallel with multiple instances of the scrambling sequence generator. A memory may store the initial LFSR states for the scrambling sequence generator for each segment.

In an alternative design, a single scrambling sequence of length 2N may be used to generate the downlink reference signal. The start of this scrambling sequence may be mapped to the leftmost (or most negative) frequency, and the scrambling sequence may traverse to the rightmost (or most positive) frequency. In this design, an initial portion of the scrambling sequence may be discarded, with the amount to discard being dependent on the system bandwidth. This design essentially generates the entire scrambling sequence for 20 MHz and uses only the variable length center portion as needed for the particular system bandwidth. This design may require more overhead because a portion of the generated scrambling bits would be thrown away.

Figure 5:
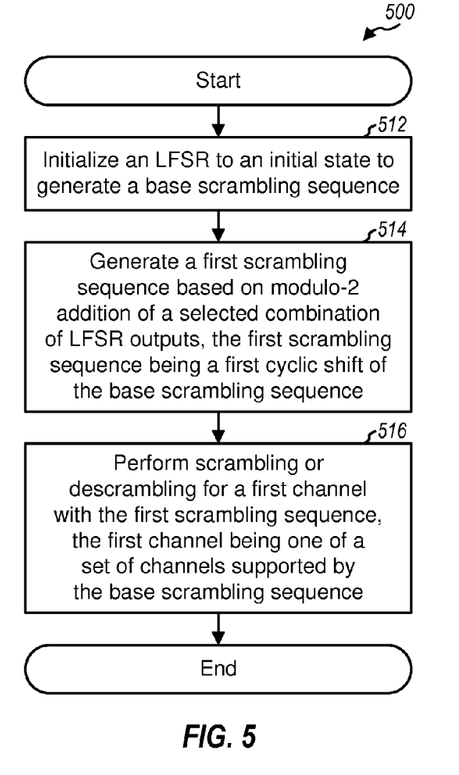
FIG. 5 shows a process for performing scrambling or descrambling.

FIG. 5 shows a design of a process 500 for performing scrambling at a transmitter or descrambling at a receiver in a communication system. Process 500 may be performed by a Node B, a UE, or some other entity.

An LFSR may be initialized to an initial state to generate a base scrambling sequence (block 512). A first scrambling sequence may be generated based on modulo-2 addition of a selected combination of LFSR outputs, with the first scrambling sequence being a first cyclic shift of the base scrambling sequence (block 514). Scrambling or descrambling for a first channel may be performed with the first scrambling sequence, with the first channel being one of a set of channels and possibly signals supported by the base scrambling sequence (block 516). A second scrambling sequence may also be generated based on modulo-2 addition of a second selected combination of LFSR outputs, with the second scrambling sequence being a second cyclic shift of the base scrambling sequence. The first and second scrambling sequences may be generated in parallel based on different combinations of LFSR outputs. Scrambling or descrambling for a second channel or a reference signal may be performed with the second scrambling sequence.

In one design of block 512, the LFSR may implement a single generator polynomial that is applicable for all supported channels and signals. The LFSR may be reset for each application of scrambling or descrambling for the first channel. The LFSR may be initialized to the same initial state for all supported channels and signals.

Figure 6:
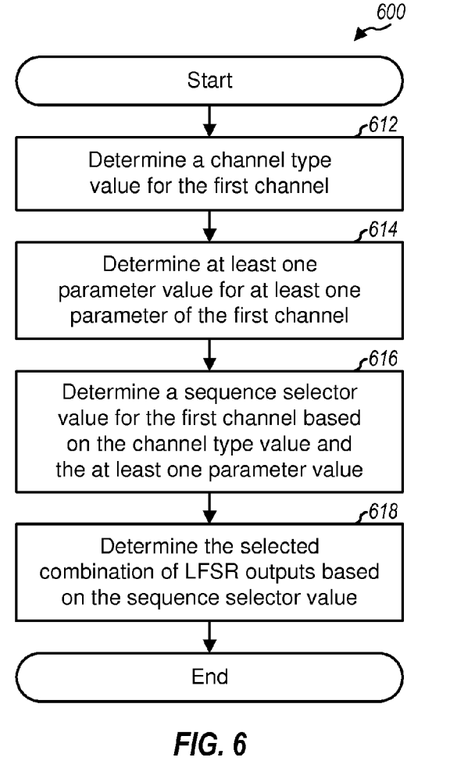
FIG. 6 shows a process for generating a scrambling sequence.

FIG. 6 shows a design of a process 600 for generating the first scrambling sequence. Process 600 is one design of block 514 in FIG. 5. A channel type value for the first channel may be determined (block 612). At least one parameter value for at least one parameter of the first channel may also be determined (block 614). A sequence selector value for the first channel may be determined based on the channel type value and the at least one parameter value (block 616). The combination of LFSR outputs to perform modulo-2 addition may be determined based on the sequence selector value (block 618). The first scrambling sequence may be obtained by (i) selecting or deselecting each output bit of the LFSR based on the sequence selector value and (ii) summing the selected output bits of the LFSR with modulo-2 addition to obtain the first scrambling sequence.

The sequence selector value may comprise a first set of bits that may be assigned different values for different channels and signals supported by the base scrambling sequence. The sequence selector value may also comprise a second set of bits for channel-specific or signal-specific parameters. The supported channels and signals may include a broadcast channel, a multicast channel, a downlink shared channel, a downlink control channel, an uplink shared channel, an uplink control channel, a reference signal, some other channel or signal, or any combination thereof. The channel-specific or signal-specific parameters may include a cell ID, an antenna ID, a frame ID, a subframe ID, a symbol ID, a UE ID, a stream ID, a code block ID, some other parameter, or any combination thereof.

Figure 7:
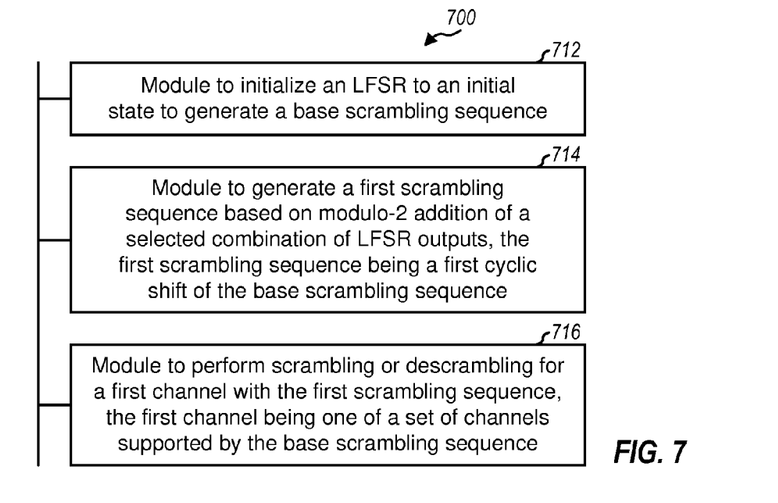
FIG. 7 shows an apparatus for performing scrambling or descrambling.

FIG. 7 shows a design of an apparatus 700 for performing scrambling or descrambling in a communication system. Apparatus 700 includes a module 712 to initialize a LFSR to an initial state to generate a base scrambling sequence, a module 714 to generate a first scrambling sequence based on modulo-2 addition of a selected combination of LFSR outputs, with the first scrambling sequence being a first cyclic shift of the base scrambling sequence, and a module 716 to perform scrambling or descrambling for a first channel with the first scrambling sequence, the first channel being one of a set of channels supported by the base scrambling sequence.

Figure 8:
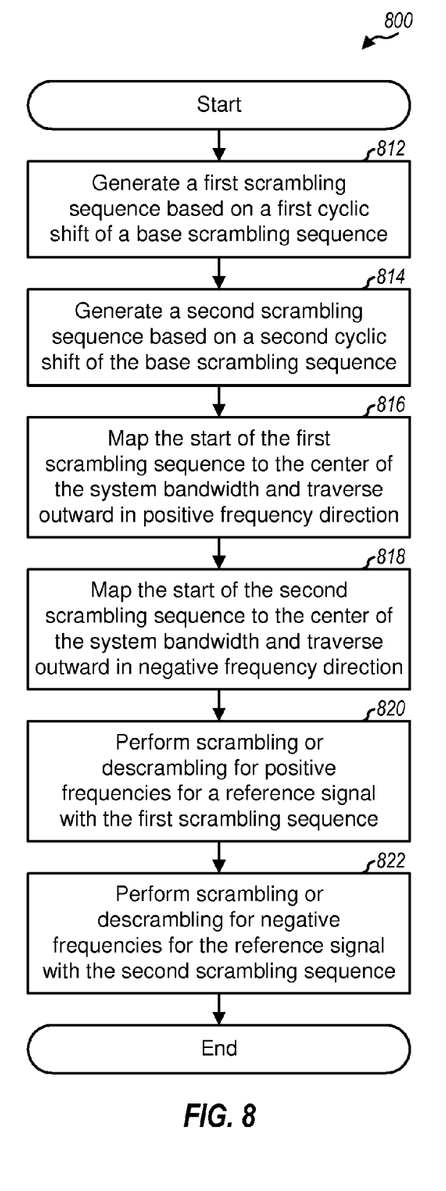
FIG. 8 shows a process for processing a reference signal.

FIG. 8 shows a design of a process 800 for processing a reference signal. Process 800 may be performed by a Node B, a UE, or some other entity. A first scrambling sequence may be generated based on a first cyclic shift of a base scrambling sequence (block 812). A second scrambling sequence may be generated based on a second cyclic shift of the base scrambling sequence (block 814). The first scrambling sequence may have its start mapped to the center of the system bandwidth and may traverse outwardly in positive frequency direction, e.g., as shown in FIG. 4 (block 816). The second scrambling sequence may have its start mapped to the center of the system bandwidth and may traverse outwardly in negative frequency direction, e.g., as also shown in FIG. 4 (block 818). Scrambling or descrambling for positive frequencies for a reference signal may be performed with the first scrambling sequence (block 820). Scrambling or descrambling for negative frequencies for the reference signal may be performed with the second scrambling sequence (block 822).

In one design of blocks 812 and 814, a first sequence selector value comprising a first value for a frequency polarity parameter (e.g., the Frequency_+/− parameter) may be determined. A second sequence selector value comprising a second value for the frequency polarity parameter may also be determined. The base scrambling sequence may be cyclically shifted based on the first sequence selector value to obtain the first scrambling sequence. The base scrambling sequence may also be cyclically shifted based on the second sequence selector value to obtain the second scrambling sequence.

In one design of blocks 812 and 814, at least one scrambling sequence generator may be reset to a starting point. The first M scrambling bits of the first scrambling sequence may be generated with the scrambling sequence generator(s), where M is determined based on the system bandwidth. The first M scrambling bits of the second scrambling sequence may also be generated with the scrambling sequence generator(s).

Figure 9:
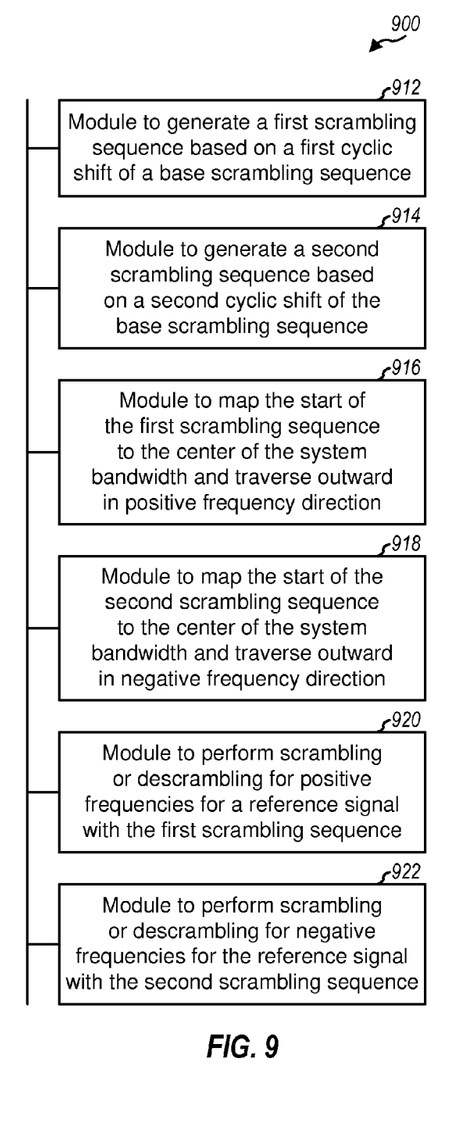
FIG. 9 shows an apparatus for processing a reference signal.

FIG. 9 shows a design of an apparatus 900 for processing a reference signal. Apparatus 900 includes a module 912 to generate a first scrambling sequence based on a first cyclic shift of a base scrambling sequence, a module 914 to generate a second scrambling sequence based on a second cyclic shift of the base scrambling sequence, a module 916 to map the start of the first scrambling sequence to the center of the system bandwidth and traverse outwardly in positive frequency direction, a module 918 to map the start of the second scrambling sequence to the center of the system bandwidth and traverse outwardly in negative frequency direction, a module 920 to perform scrambling or descrambling for positive frequencies for a reference signal with the first scrambling sequence, and a module 922 to perform scrambling or descrambling for negative frequencies for the reference signal with the second scrambling sequence.

The modules in FIGS. 7 and 9 may comprise processors, electronics devices, hardware devices, electronics components, logical circuits, memories, etc., or any combination thereof.

Figure 10:
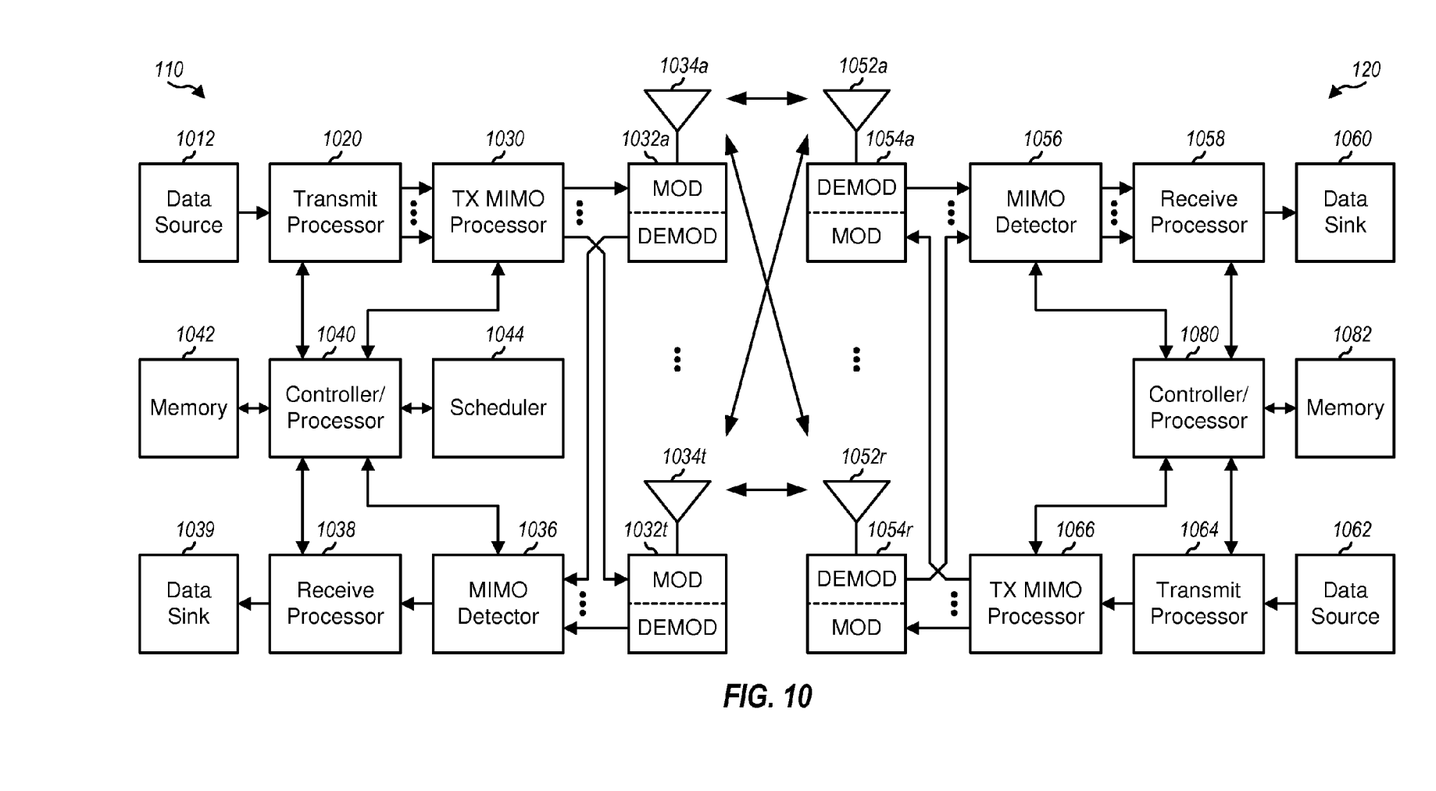
FIG. 10 shows a block diagram of a Node B and a UE.

FIG. 10 shows a block diagram of a design of a Node B 110 and a UE 120, which may be one of the Node Bs and one of the UEs in FIG. 1. In this design, Node B 110 is equipped with T antennas 1034a through 1034t, and UE 120 is equipped with R antennas 1052a through 1052r, where in general T≥1 and R≥1.

At Node B 110, a transmit processor 1020 may receive traffic data for one or more UEs from a data source 1012, process the traffic data for each UE based on one or more modulation and coding schemes selected for that UE, and provide symbols for shared/data channels. Transmit processor 1020 may receive and process broadcast and multicast data and provide symbols for broadcast and multicast channels. Transmit processor 1020 may also receive and process control information from a controller/processor 1040 and provide symbols for control channels. Transmit processor 1020 may also generate symbols for reference signals, synchronization signals, etc. Transmit processor 1020 may perform scrambling for different channels and signals, as described above.

A transmit (TX) multiple-input multiple-output (MIMO) processor 1030 may multiplex the symbols for different channels and signals. TX MIMO processor 1030 may perform spatial processing (e.g., precoding) on the multiplexed symbols, if applicable, and provide T output symbol streams to T modulators (MODs) 1032a through 1032t. Each modulator 1032 may process a respective output symbol stream (e.g., for OFDM) to obtain an output sample stream. Each modulator 1032 may further process (e.g., convert to analog, amplify, filter, and upconvert) the output sample stream to obtain a downlink signal. T downlink signals from modulators 1032a through 1032t may be transmitted via T antennas 1034a through 1034t, respectively.

At UE 120, antennas 1052a through 1052r may receive the downlink signals from Node B 110 and provide received signals to demodulators (DEMODs) 1054a through 1054r, respectively. Each demodulator 1054 may condition (e.g., filter, amplify, downconvert, and digitize) a respective received signal to obtain input samples and may further process the input samples (e.g., for OFDM) to obtain received symbols. A MIMO detector 1056 may obtain received symbols from all R demodulators 1054a through 1054r, perform MIMO detection on the received symbols if applicable, and provide detected symbols. A receive processor 1058 may process (e.g., demodulate, deinterleave, and decode) the detected symbols, provide decoded data for UE 120 to a data sink 1060, and provide decoded control information to a controller/processor 1080.

On the uplink, at UE 120, traffic data from a data source 1062 and control information from controller/processor 1080 may be processed by a transmit processor 1064, further processed by a TX MIMO processor 1066 if applicable, conditioned by modulators 1054a through 1054r, and transmitted to Node B 110. At Node B 110, the uplink signals from UE 120 may be received by antennas 1034, conditioned by demodulators 1032, processed by a MIMO detector 1036 if applicable, and further processed by a receive processor 1038 to obtain the traffic data and control information transmitted by UE 120.

Controllers/processors 1040 and 1080 may direct the operation at Node B 110 and UE 120, respectively. Memories 1042 and 1082 may store data and program codes for Node B 110 and UE 120, respectively. A scheduler 1044 may schedule UEs for downlink and/or uplink transmission and may provide assignments of resources for the scheduled UEs.

Process 500 in FIG. 5, process 600 in FIG. 6, process 800 in FIG. 8 and/or other processes for the techniques described herein may be performed by one or more processors at Node B 110 and also by one or more processors at UE 120. For example, transmit processors 1020 and 1064 may perform process 500 and/or 600 for scrambling, and receive processors 1038 and 1058 may perform process 500 and/or 600 for descrambling. Transmit processor 1020 may also perform process 800 for scrambling of a downlink reference signal, and receive processor 1058 may perform process 800 for descrambling of the downlink reference signal.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method for communication, performed by at least one processor, comprising:
   mapping a start of a first scrambling sequence to a center of a system bandwidth and traversing outwardly in a positive frequency direction;
   mapping a start of a second scrambling sequence to the center of the system bandwidth and traversing outwardly in a negative frequency direction;
   performing scrambling or descrambling for positive frequencies for a reference signal with the first scrambling sequence; and
   performing scrambling or descrambling for negative frequencies for the reference signal with the second scrambling sequence.

2. The method of claim 1, further comprising:
   generating the first scrambling sequence based on a first cyclic shift of a base scrambling sequence; and
   generating the second scrambling sequence based on a second cyclic shift of the base scrambling sequence.

3. The method of claim 1, further comprising:
generating first M scrambling bits of the first scrambling sequence with at least one scrambling sequence generator, where M is determined based on the system bandwidth; and
generating first M scrambling bits of the second scrambling sequence with the at least one scrambling sequence generator.

4. The method of claim 1, further comprising:
determining a first sequence selector value comprising a first value for a frequency polarity parameter;
determining a second sequence selector value comprising a second value for the frequency polarity parameter;
cyclically shifting a base scrambling sequence based on the first sequence selector value to obtain the first scrambling sequence; and
cyclically shifting the base scrambling sequence based on the second sequence selector value to obtain the second scrambling sequence.

5. An apparatus for communication, comprising:
at least one processor configured to:
map a start of a first scrambling sequence to a center of a system bandwidth and traverse outwardly in a positive frequency direction;
map a start of a second scrambling sequence to the center of the system bandwidth and traverse outwardly in a negative frequency direction;
perform scrambling or descrambling for positive frequencies for a reference signal with the first scrambling sequence; and
perform scrambling or descrambling for negative frequencies for the reference signal with the second scrambling sequence.

6. The apparatus of claim 5, wherein the at least one processor is further configured to generate the first scrambling sequence based on a first cyclic shift of a base scrambling sequence, and to generate the second scrambling sequence based on a second cyclic shift of the base scrambling sequence.

7. The apparatus of claim 5, wherein the at least one processor is further configured to generate first M scrambling bits of the first scrambling sequence with at least one scrambling sequence generator, where M is determined based on the system bandwidth, and to generate first M scrambling bits of the second scrambling sequence with the at least one scrambling sequence generator.

8. The apparatus of claim 5, wherein the at least one processor is further configured to determine a first sequence selector value comprising a first value for a frequency polarity parameter, to determine a second sequence selector value comprising a second value for the frequency polarity parameter, to cyclically shift a base scrambling sequence based on the first sequence selector value to obtain the first scrambling sequence, and to cyclically shift the base scrambling sequence based on the second sequence selector value to obtain the second scrambling sequence.

9. A non-transitory computer-readable medium having computer executable code stored thereon, the computer executable code comprising:
code for mapping a start of a first scrambling sequence to a center of a system bandwidth and traversing outwardly in a positive frequency direction; and
code for mapping a start of a second scrambling sequence to the center of the system bandwidth and traversing outwardly in a negative frequency direction;
code for performing scrambling or descrambling for positive frequencies for a reference signal with the first scrambling sequence; and
code for performing scrambling or descrambling for negative frequencies for the reference signal with the second scrambling sequence.

10. The non-transitory computer-readable medium of claim 9, further comprising:
code for generating the first scrambling sequence based on a first cyclic shift of a base scrambling sequence; and
code for generating the second scrambling sequence based on a second cyclic shift of the base scrambling sequence.

11. The non-transitory computer-readable medium of claim 9, further comprising:
code for generating first M scrambling bits of the first scrambling sequence with at least one scrambling sequence generator, where M is determined based on the system bandwidth; and
code for generating first M scrambling bits of the second scrambling sequence with the at least one scrambling sequence generator.

12. The non-transitory computer-readable medium of claim 9, further comprising:
code for determining a first sequence selector value comprising a first value for a frequency polarity parameter;
code for determining a second sequence selector value comprising a second value for the frequency polarity parameter;
code for cyclically shifting a base scrambling sequence based on the first sequence selector value to obtain the first scrambling sequence; and
code for cyclically shifting the base scrambling sequence based on the second sequence selector value to obtain the second scrambling sequence.

* * * * *